United States Patent [19]

Beatty et al.

[11] Patent Number: 4,581,304
[45] Date of Patent: Apr. 8, 1986

[54] THERMOFORMED FILM MEMBER VENT FOR GALVANIC CELLS

[75] Inventors: Theodore R. Beatty, Bay Village; Randolph J. Glau, Westlake, both of Ohio

[73] Assignee: Union Carbide Corporation, Danbury, Conn.

[21] Appl. No.: 671,464

[22] Filed: Nov. 14, 1984

[51] Int. Cl.⁴ .............................................. H01M 2/12
[52] U.S. Cl. ........................................ 429/56; 429/82
[58] Field of Search ....................... 429/53, 56, 86, 89, 429/82, 185, 84

[56] References Cited

U.S. PATENT DOCUMENTS

| | | | |
|---|---|---|---|
| 598,408 | 4/1898 | Beatty . | |
| 2,558,654 | 4/1949 | Kendall et al. | 429/54 |
| 3,197,547 | 7/1965 | Peace, Jr. et al. | 429/56 X |
| 3,218,197 | 9/1963 | Carmichael et al. | 429/56 |
| 3,219,488 | 11/1965 | Southworth, Jr. | 429/56 |
| 3,741,812 | 6/1973 | Spellman et al. | 429/53 |

FOREIGN PATENT DOCUMENTS 1177223 9/1964 Fed. Rep. of Germany .

OTHER PUBLICATIONS

Plastic Materials and Process, (Seymour R. Schwartz and Sidney H. Goodman), pp. 632-649, Van Nostrand, Reinhold & Co. (1982).

Encyclopedia of Polymer Science and Technology, vol. 13, pp. 832-843 Wiley-Interscience (1979).

Primary Examiner—Anthony Skapars
Attorney, Agent, or Firm—C. F. O'Brien

[57] ABSTRACT

Galvanic cells having at least one safety vent mechanism comprised of a thermoformed film member retained across a vent aperture located in the cover of the cell demonstrate consistent venting pressures.

16 Claims, 5 Drawing Figures

THERMOFORMED FILM MEMBER VENT FOR GALVANIC CELLS

FIELD OF THE INVENTION

This invention relates to a galvanic cell having at least one safety vent mechanism comprised of a thermoformed film member retained across a vent aperture located in the cover of the cell. In another aspect, this invention relates to a process for the manufacture of a galvanic cell having such a safety vent mechanism.

BACKGROUND OF THE INVENTION

The chemical nature of many electrochemical systems employed for the production of electricity is such that gas, usually hydrogen, is generated during storage and sometimes during or following service use. When sealed cell containers are employed, as is the case in certain primary and secondary cells, the build-up of gas-pressure within the sealed container may cause damage to the cell and/or the device in which the cell is employed.

One approach which has been taken in the past to avoid such a potentially dangerous build-up of pressure involves the continuous or periodic release of excess pressure through a resealable valve system. However, while many of these valve-type venting systems will satisfactorily relieve high gas pressures they unfortunately will, in many situations, permit electrolyte leakage. For example, when employed in alkaline cells, release valves which are intended to reseal after activation under pressure are easily fouled by salts formed from caustic electrolytes. These salts are formed when caustic electrolyte, which has crept along the sealing surface of the valve, combines with the carbon dioxide in the air to form a carbonate. The carbonate salt cakes the valve surface and prevents proper resealing of the valve, with the result that more electrolyte will then leak through the partially opened valve. Moreover, most resealable valve systems require the use of additional parts which increase cost and which occupy internal cell volume which could otherwise be filled with active cell material.

A second approach that has been employed in the prior art involves the use of blow out membranes. These membranes have been of two basic types: puncture mechanisms and rupture mechanisms.

Puncture mechanisms employ a spiked member which, when sufficient internal pressure develops, is pushed by such pressure so that the spike punches a hole in a thin membrane located near said spiked member. However, a problem with this mechanism is that the hole may become plugged by the spike and/or by other components from within the cell. Moreover, the design of such puncture mechanisms frequently required that the venting mechanism take up a comparatively large volume of space which could otherwise be employed to contain additional active material within the cell.

Rupture mechanisms employ a seal at least a portion of which is comprised of a thin membrane. This thin membrane ruptures when the interior pressure of the cell becomes too great. In the past, rupture mechanisms have involved the use of either molded or stressed membranes. While rupture mechanisms have the advantage of occupying only a minimal amount of internal cell volume, reliably obtaining uniform venting pressure in either molded or stressed types of rupture mechanisms is difficult, particularly when low pressure venting is desired. For example, in molded membrane constructions (such as that exemplified by U.S. Pat. No. 3,218,197) limitations of the molding process place restrictions on how thin rupture membranes may be molded in addition to creating difficulties in producing a uniform thickness of the membranes such that the blow out pressure will be consistent for a number of cells. Similarly, in stressed rupture mechanisms (such as that shown in German Auslegeschrift No. 1,177,223) the lateral stress exerted along the stressed membrane may vary from cell to cell so as to preclude consistent venting pressures for a number of cells.

It is therefore an object of this invention to provide a galvanic cell having a safety vent mechanism which mechanism occupies only a minimum amount of internal cell volume and which will rupture at a predictable safe predetermined pressure.

It is a further object of this invention to provide a method for the production of a galvanic cell with a nonsealable reliable safety vent mechanism, which mechanism occupies only a minimal amount of internal cell volume.

The foregoing and additional objects of this invention will become apparent from the following description and accompanying drawings and Example.

DESCRIPTION OF THE INVENTION

In one respect, the present invention relates to a sealed galvanic cell comprising a container having a base, an upstanding wall and an open end defined by said upstanding wall; a cover having a peripheral sealing portion, a top surface, and an undersurface including a nonsealing area, said cover having at least one vent aperture through said top surface and the nonsealing area of said undersurface; said cover being disposed over and secured to the open end of the container with a gasket positioned between the open end of the container and the peripheral sealing portion of the cover; the improvement comprising a thermoformed film member disposed adjacent to the nonsealing area of the undersurface of the cover and extending across the at least one vent aperture, the periphery of said thermoformed film member being retained between the cover and the container.

In another aspect, this invention relates to a method for the manufacture of a sealed galvanic cell having a safety vent, which method comprises:

(a) providing a cover having a peripheral sealing portion, a top surface, and an undersurface having a nonsealing area, said cover having at least one vent aperture through said top surface and the nonsealing area of said undersurface;

(b) providing a thermoformed film member having a contour adapted to be disposed adjacent to the nonsealing area of the undersurface of the cover and to extend across the at least one vent aperture present in said cover;

(c) disposing anodic and cathodic materials within a cell container having a base, an upstanding wall, and an open end defined by such upstanding wall;

(d) forming a cover vent seal subassembly comprising said cover, said thermoformed film member and a gasket with the thermoformed film member being disposed adjacent to the nonsealing area of the undersurface of the cover and extending across the at least one vent aperture and the gasket being disposed adjacent to at least a part of the peripheral sealing portion of the cover; and (e) securing the cover vent seal subassembly to the open end of the container with the thermoformed film member and the gasket retained between the cover and the container so as to seal the cell and form a safety vent mechanism operable such that the film member will rupture when the internal pressure of the cell exceeds a predetermined limit.

As is employed herein the term "nonsealing area" refers to that portion of the undersurface of the cover which is not disposed in a closure relationship with the gasket upon sealing of the cell. The term "peripheral sealing portion" refers to those surfaces of the cover which are disposed in a closure relationship with the gasket upon sealing of the cell.

Moreover, as is employed herein the term "thermoforming" includes the techniques of vacuum-forming, blow molding and the like. The process of thermoforming is well known in the prior art and typically involves the employment of higher or lower pressures in conjunction with the application of heat to the material to be thermoformed. Thermoforming has the advantage that very thin-walled objects can be formed that cannot be produced by any other method. The process of thermoforming is described in detail in *Plastic Materials and Processes*, (Seymour R. Schwartz and Sidney H. Goodman), pages 632–649, Van Nostrand, Reinhold & Co. (1982) and in Encyclopedia of Polymer Science and Technology, vol. 13, pp. 832–843 Wiley-Interscience (1979).

The safety vent mechanism of the cell of the present invention comprises a thermoformed film member which is placed adjacent to the nonsealing area of the undersurface of the cover. Such film member extends across an at least one vent aperture present in said cover. The thermoformed film member employed in the cell of this invention preferably comprises at least one upstanding wall at least a portion of which is adapted to be positioned substantially parallel to the upstanding wall of the cell container.

Because the film member of the cell of this invention is preferably pre-formed to its final contour before assembly into the cell (unlike thin film membranes which are employed in stressed-type rupture venting mechanisms), such film member is not subject to lateral stress after its incorporation into the finished cell. Moreover (unlike thin films formed by processes such as injection molding), the thermoformed film member employed in the cell of this invention may be produced with a substantially uniform thickness of 0.015 inch or less. Thus cells employing the safety vent mechanism of this invention will vent at uniform and predictable pressures.

In the design of any particular rupture-type safety vent mechanism, there are a number of variables which must be taken into account. The pressure required for the blow-out or rupture of the film to occur is dependent upon the physical properties of the film member material, such as its tensile strength, the thickness of the film member and the area of the film member across the aperture. For any given material, the pressure at which the material will rupture increases with increased thickness of the film member. The pressure at which the film member will rupture will decrease with increased vent aperture area.

In some embodiments of the safety vent mechanism of the cell of this invention it is desirable to employ a film member which is hydrogen permeable in order to permit continuous hydrogen diffusion from the interior of the cell. The rate of hydrogen diffusion through the film member is dependent upon the material employed, the film member area and its thickness, and the pressure differential across the film member.

Table I indicates the hydrogen gas permeability characteristics of some of the various plastic materials of which the film member may preferably be composed. Also listed are the diffusion constants of water vapor through the various materials, as in certain cell systems it is desirable that the passage of water vapor through the film member be minimized.

TABLE I

| Water and Hydrogen Transmission[1] | | |
|---|---|---|
| Material | $H_2$[2] | $H_2O$[3] |
| Nylon 6 | 90–110 | 16–22 |
| High Density Polyethylene | 1950 | .3 |
| Polypropylene (unoriented) | 1700 | .7 |
| Plasticized polyvinyl-chloride (cast) | 10–150 | 6–10 |

[1]Source: Modern Plastics Encyclopedia, Vol. 55, No. 10A, pp. 641–644, McGraw-Hill (1978).
[2]in cubic centimeters per mil of thickness 100 square inches per 24 hours at 25° C.
[3]in grams per mil of thickness per 100 square inches per 24 hours at 37.8° C.

By employing the above data, one skilled in the art will be able to determine by means of simple calculation the hydrogen gas and water diffusion rates for the listed materials in Table I at various thicknesses and areas.

It is apparent from Table I that some materials will diffuse hydrogen at a much faster rate than others. Thus the characteristics and properties of the active materials of a particular galvanic cell in which the film member is to be employed should be considered in selecting the most desirable material for the film member.

The film member of the cells of this invention should be made of a material which is thermoformable, substantially nonporous, chemically inert to the reactants in the cell, relatively strong, and which is capable of being mechanically secured across the venting aperture. As will be apparent to one skilled in the art, if the film member contacts both the anode and the cathode then the film member must be nonconductive. Preferably, for most cell applications, the film member employed should be hydrogen permeable. Illustrative of the materials of which the film member may be composed are plastics such as vinyl, nylon, polyethylene, polypropylene, polysulfone and the like, as well as copolymers of two or more of these materials. Film members composed of two or more layers of the same or different thermoformable materials may also be employed to obtain the desired properties. In addition, composites of a thermoformable material and another material, include sealants such as asphalt, may be utilized.

The thermoformed film member employed for use in most cell sizes should preferably be between about 0.001 and about 0.015 inch, most preferably between about 0.004 and about 0.01 inch, in film thickness. When film members composed of two or more layers of thermoformable material are employed, such individual layers may be of thicknesses of less than 0.001 inch if desired so long as the overall thickness of the film member is greater than about 0.001 inch.

In some embodiments of the cell of this invention an adhesive may be applied to at least a portion of those surfaces of the thermoformed film which are disposed in a sealing relationship with another component of the cell so as to improve the leakproofness of the cell at that seal. Preferably, such adhesives are fast bonding and will exhibit chemical resistance to the active components of the cell coupled with long term stability. Illustrative of the adhesives which may be employed are polyamide hot melts, ultraviolet cured acrylics, epoxies, and the like. As will be apparent to one skilled in the art the preferred adhesive will vary depending upon the composition of the film member, the composition, of the surface to which the film is bonded, and other similar factors.

The cell of the present invention is typically manufactured as follows. A cell cover having a peripheral sealing portion, a top surface and an undersurface comprising a nonsealing area is provided. Such cover has at least one vent aperture which extends through said top surface and the nonsealing area of said undersurface. A thermoformed film member having a contour adapted to be disposed adjacent to the nonsealing area of the undersurface of the cover and to extend across the at least one vent aperture is also provided.

A cover vent seal subassembly is formed by placing the cover and film member, along with a gasket, together such that the film member is disposed adjacent to the nonsealing area of the undersurface of the cover and extends across the at least one vent aperture defined in the cover, and such that the gasket is positioned adjacent to at least one vent aperture defined in the cover, and such that the gasket is positioned adjacent to at least a portion of the peripheral sealing portion of the cover. Preferably, the film member is in contact with the entire nonsealing area of the cover.

In some embodiments of the cell of this invention the thermoformed film member is in contact with at least a section of, preferably with the entire, sealing portion of the undersurface of the cover, with the gasket being disposed such that the film member extends between the gasket and the undersurface of the cover. In these embodiments, most preferably the film member further comprises an upstanding peripheral wall at least one portion of which extends between the rim of the cover and the gasket, said at least one portion of the upstanding wall of the film member extending substantially parallel to the upstanding wall of the cell container.

In other embodiments of the cell of this invention the gasket is positioned in contact with the sealing portion of the cover, with the thermoformed film member extending about at least a section of, preferably about the entire, underside of the gasket. In these embodiments, most preferably the thermoformed film member further comprises an upstanding peripheral wall at least one portion of which extends between the gasket and the upstanding wall of the container, said at least one portion of the upstanding wall of the film member extending substantially parallel to said upstanding wall of the container.

Preferably a bushing is placed so as to extend through the top surface and nonsealing portion of the undersurface of the cover and through the film member disposed adjacent thereto, most preferably at the center of the cover. This bushing serves to additionally secure the film member tightly to the cover thereby aiding in ensuring that rupture of the safety vent mechanism at the desired pressure is obtained. Such bushing may define an aperture through which a terminal may be inserted.

In some embodiments of this invention, the bushing may further comprise a flange extending along the undersurface of the cell cover. In these embodiments the film member extends between the flange of the bushing and the undersurface of the cover.

In other embodiments, the gasket and the bushing can comprise a single entity. In these embodiments such entity must include at least one opening such that the safety vent mechanism is exposed to the interior of the cell. Moreover, in these embodiments the thermoformed film member must be disposed between the cover and the gasket/bushing entity.

In all embodiments of this invention wherein a bushing is present, the thermoformed film member preferably further comprises an inner upstanding wall at least one portion of which extends between the bushing and the cell cover, said at least one portion of the inner upstanding wall of the film member extending substantially parallel to the upstanding wall of the cell container.

The electrochemically active materials are then typically disposed within the container. The cover vent seal subassembly is positioned over the open end of the container. Such assembly is then secured to the open end of the container, typically by compression of the cell container, so as to seal the cell.

BRIEF DESCRIPTION OF THE DRAWINGS

The present invention will become more apparent from the following description thereof when considered together with the accompanying drawings which are set forth as being exemplary of the present invention and are not intended in any way to be limitative thereof and wherein.

DETAILED DESCRIPTION OF THE DRAWINGS

Figure 1:
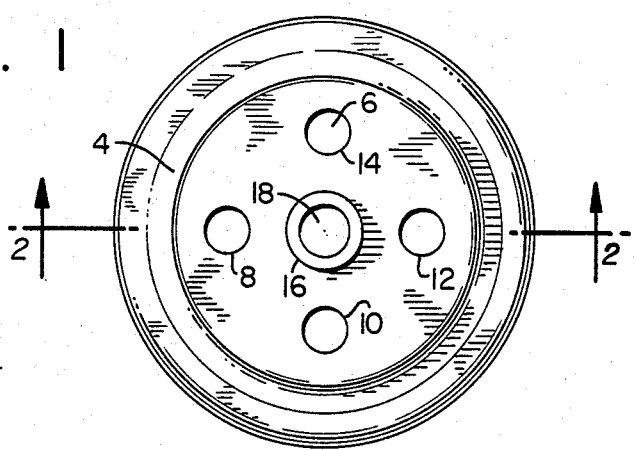
FIG. 1 is a top view of a cover vent seal subassembly of a first preferred embodiment of this invention.

Turning now to FIG. 1, it is seen that the cover vent seal subassembly is comprised of cover 4 and thermoformed film member 6. Vent apertures 8, 10, 12 and 14 extend through cover 4. Although four vent apertures are shown, fewer or more vent apertures may be present as only one vent aperture is required. Similarly, although the vent apertures are pictured as circular, such apertures may be oval, rectangular or otherwise regularly or irregularly shaped, although, as will be apparent to those skilled in the art, the shape of the vent orifice may have some effect on the membrane rupture pressure.

Bushing 16 extends through cover 4 and film member 6. Bushing 16 defines center hole 18, through which a terminal may be extended.

Figure 2:
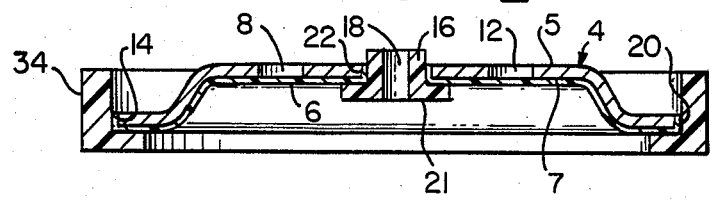
FIG. 2 is a partial sectional elevational view of the cover/film member subassembly of FIG. 1, taken through the plane 2—2.

FIG. 2 shows a cross-sectional view of the cover vent seal subassembly of FIG. 1 taken along the plane indicated by 2—2 in FIG. 1. Turning to FIG. 2 it is seen that cover 4 comprises a top surface 5 and an undersurface 7. Vent apertures 8 and 12 extend through said top surface and undersurface. Thermoformed film member 6 is disposed adjacent to the nonsealing portion of the undersurface of cover 4, and, in this first preferred embodiment, such film member is disposed in contact with the entire undersurface of cover 4. Moreover, thermoformed film member 6 extends across venting apertures 8 and 12. Gasket 34 is disposed adjacent to at least a part of the peripheral sealing portion of the cover. Cover 4 and thermoformed film member 6 may be friction fitted within gasket 34 or other conventional means such as snap fitting may be employed. As shown in this first preferred embodiment, thermoformed film member 6 further comprises upstanding peripheral wall 20, which is disposed between the outer rim 14 of cover 4 and gasket 34. Thermoformed film member 6 additionally comprises inner upstanding wall 22, which is disposed between bushing 16 and cover 4. In the embodiment pictured, bushing 16 comprises flange 21. Bushing 16 extends through cover 4 and secures the film member to the cover, thereby aiding in ensuring rupture at the desired predetermined pressure. Bushing 16 defines center hole 18 which is adapted to have a terminal extend therethrough.

Figure 3:
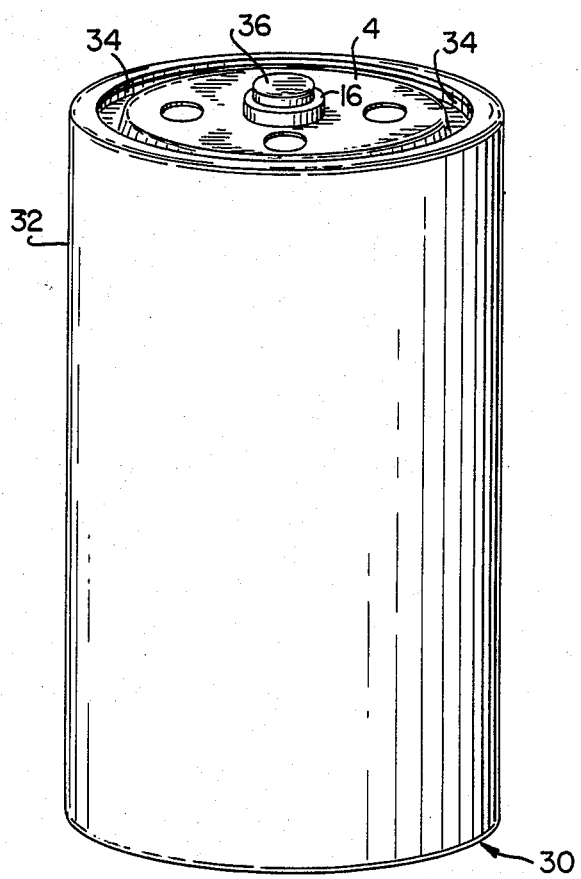
FIG. 3 is a perspective view of a galvanic cell employing the cover/film member subassembly of FIGS. 1 and 2.

FIG. 3 shows a perspective view of a galvanic cell employing the cover vent seal subassembly of FIGS. 1 and 2. Such cell includes cell container 30 comprising upstanding wall 32 which defines an open end. Anodic and cathodic materials are disposed within container 30. Gasket 34 is disposed between the open end of container 30 and peripheral sealing area of cover 4. Terminal 36 extends through bushing 16. When the internal pressure of the cell exceeds a predetermined limit, the thermoformed film member will rupture, thereby providing a vent passage from the cell.

Figure 4:
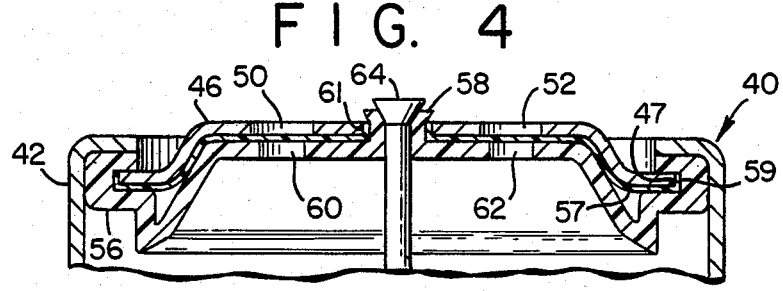
FIG. 4 is a partial sectional view of a cell exhibiting a second preferred embodiment of this invention.

FIG. 4 shows a partial sectional view of a cell exhibiting a second preferred embodiment of this invention. Cell 40 is comprised of cell container, having upstanding wall 42, and a cover 46. Vent apertures 50 and 52 extends through cover 46. Gasket 56 is disposed between the open end of the container defined by upstanding wall 42 and the peripheral sealing area of cover 46. In this second preferred embodiment thermoformed film member 57 is disposed in contact with the entire undersurface of cover 46. Film member 57 extends across vent apertures 50 and 52. As shown, film member 57 further comprises upstanding peripheral wall 59 which extends between rim 47 of cover 46 and gasket 56, said upstanding peripheral wall extending substantially parallel to upstanding wall 42 of the cell container. Moreover, film member 57 also comprises inner upstanding wall 61 which extends between cover 46 and bushing 58, said inner upstanding wall extending substantially parallel to upstanding wall 42 of the cell container. Gasket 56 extends across the entire open end of the container and includes opening 60 and 62, which are positioned beneath vent apertures 50 and 52 in cover 46. Gasket 56 also comprises bushing 58 through which extends terminal 64, which is connected to an electrode or electrode collector.

Figure 5:
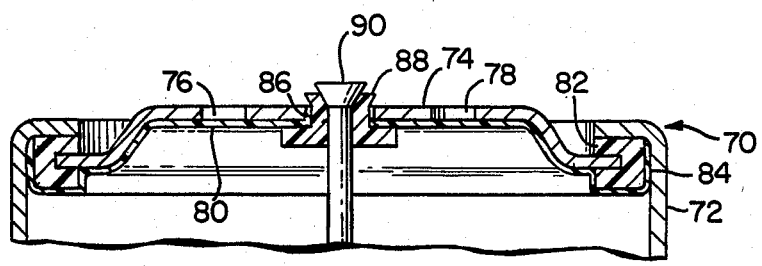
FIG. 5 is a partial sectional view of a cell exhibiting a third preferred embodiment of this invention.

FIG. 5 shows a partial sectional view of a cell exhibiting a third preferred embodiment of this invention. Cell 70 is comprised of a cell container having upstanding wall 72 and cover 74. Vent apertures 76 and 78 extend through cover 74. Thermoformed film member 80 is disposed adjacent to the nonsealing area of the undersurface of cover 74 and extends across vent apertures 76 and 78. Gasket 82 is positioned in contact with the sealing portion of cover 74, with thermoformed film member 80 extending about the underside of gasket 82. Thermoformed film member 80 comprises upstanding peripheral wall 84 which extends between upstanding container wall 72 and gasket 82. Film member 80 also comprises inner upstanding wall 86 which extends between bushing 88 and cover 74, inner upstanding wall 86 extending substantially parallel to upstanding container wall 72. Terminal 90 extends through bushing 88. When the internal pressure of cell 70 exceeds a predetermined limit film member 80 will rupture, thereby providing a vent passage for the safe release of such pressure.

EXAMPLE

The following Example is intended to further illustrate the invention and is not intended to limit the scope of the invention in any respect.

EXAMPLE 1

Several lots of "D" size cells each containing a molded manganese dioxide cathode, a cellulosic separator and a powdered zinc gel anode were constructed employing the seal construction of FIG. 4. The thermoformed film member in each cell had a thickness of 0.005 inch and was comprised of the material indicated in Table II. The cell cover defined four venting apertures each of which were oval shaped measuring 0.312 inch long and 0.156 wide with 0.078 inch radius. In cell lot B asphalt was placed on the top of the thermoformed film so as to form a composite film member which would restrict the passage of water vapor therethrough.

Three cells of each type were pressurized with nitrogen gas at the rate of 50 pounds per 30 second interval by passing such gas through an aperture in the side of the cell container, which aperture was sealed about its periphery. The aperture extended through the molded cathode and into the anode area. The pressures at which the safety vent mechanism ruptured are listed in Table II.

TABLE II

| | Nitrogen Pressure Testing of Cells | | |
|---|---|---|---|
| Cell Lot | Film Composition | Asphalt | Rupture Pressure (psi) |
| A | Nylon 6 | None | 280 |
| | | | 300 |
| | | | 300 |
| B | Nylon 6 | Top of Film Member | 340 |
| | | | 365 |
| | | | 350 |
| C | Polypropylene | None | 135 |
| | | | 100 |
| | | | 130 |
| D | High Density Polyethylene | None | 175 |
| | | | 155 |
| | | | 150 |

In Table II it is seen that each cell lot exhibited a relatively uniform rupture pressure, thereby indicating the consistent venting pressures for a given cell construction are achieved employing the safety vent of this invention.

Although preferred embodiments of this invention have been described in detail, it is contemplated that modifications thereof may be made and some features may be employed without others, all within the spirit and scope of the invention.

What is claimed is:

1. In sealed galvanic cell comprising a container having a base, an upstanding wall and an open end defined by said upstanding wall; a cover having a peripheral sealing portion, a top surface, and an undersurface including a nonsealing area, said cover having at least one vent aperture through said top surface and the nonsealing area of said undersurface; said cover being disposed over and secured to the open end of the container with a gasket positioned between the open end of the container and the peripheral sealing portion of the cover: the improvement comprising a thermoformed film member disposed adjacent to the nonsealing area of the undersurface of the cover and extending across the at least one vent aperture, the periphery of said thermoformed film member being retained between the cover and the container.

2. The galvanic cell of claim 1 wherein said thermoformed film member comprises at least one upstanding wall at least a portion of which extends substantially parallel to the upstanding wall of the cell container.

3. The galvanic cell of claim 1 wherein the thermoformed film member is in contact with the entire nonsealing area of the undersurface of the cover.

4. The galvanic cell of claim 1 wherein the thermoformed film member is disposed such that said thermoformed film member extends between the gasket and the undersurface of the cover.

5. The galvanic cell of claim 4 wherein the thermoformed film member further comprises an upstanding peripheral wall, at least one portion of said peripheral wall extending between the cover and the gasket, said at least one portion of said peripheral wall being disposed substantially parallel to the upstanding wall of the container.

6. The galvanic cell of claim 1 wherein the gasket is disposed in contact with the sealing portion of the cover and the thermoformed film member extends about at least a portion of the underside of the gasket.

7. The galvanic cell of claim 6 wherein the thermoformed film member further comprises an upstanding peripheral wall, at least a portion of said peripheral wall extending between the gasket and the upstanding wall of the container.

8. The galvanic cell of claim 1 wherein a bushing extends through the top surface and nonsealing portion of the undersurface of the cover and through the thermoformed film member.

9. The galvanic cell of claim 8 wherein the thermoformed film member further comprises an inner upstanding wall at least one portion of which extends between the cover and the bushing, said at least one portion of said inner wall being disposed substantially parallel to the upstanding wall of the containers.

10. The galvanic cell of claim 8 wherein the bushing and the gasket comprise a single entity.

11. The galvanic cell of claim 1 wherein an adhesive is disposed along at least a portion of those surfaces of the thermoformed film which are disposed in a sealing relationship with another component of the cell.

12. The galvanic cell of claim 1 wherein the thermoformed film member is composed of a material selected from the group consisting of vinyl, polyethylene, polypropylene, polysulfone and nylon.

13. The galvanic cell of claim 1 wherein the thermoformed film member is composed of two or more layers of thermoformable material.

14. The galvanic cell of claim 1 wherein the thermoformed film member comprises a composite of a thermoformable material and another material.

15. The galvanic cell of claim 1 wherein the thermoformed film member possesses a thickness of between about 0.001 and about 0.015 inch.

16. The galvanic cell of claim 15 wherein the thermoformed film member possesses a thickness of between about 0.004 and about 0.01 inch.

* * * * *